Patented Sept. 21, 1926.

1,600,575

UNITED STATES PATENT OFFICE.

ALBERT M. BOWMAN, OF SAN FRANCISCO, CALIFORNIA.

MOISTUREPROOF VISION-CLARIFYING COMPOSITION.

No Drawing. Application filed August 22, 1923, Serial No. 658,844. Renewed February 16, 1926.

This invention relates particularly to a moisture proof composition adapted to be applied to transparent surfaces for visionary clarification purposes during a period when said surface would be wet and fogged by moisture.

An object of the invention is to provide a moisture proof composition which might be temporarily coated on transparent surfaces such as wind shields, and the like, during rainy or foggy weather, for clearing the same and preventing said rain or fog adhering thereon.

A further object of the invention consists in providing a porous member impregnated with a moisture proof composition which may be rubbed on wet transparent surfaces for clearing the same, whereby an unobstructed vision may be had therethrough.

A still further object of the invention is to provide a composition for clarifying wet transparent surfaces, and a device for applying said composition, that will be superior in point of simplicity and inexpensiveness of construction, positiveness of operation, and facility and convenience in use and general efficiency. Other objects and advantages will appear as this description progresses.

In this specification, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

Automobile and other vehicle that are driven in rainy weather often times can not be safely controlled or driven by reason of the wind shield being entirely covered with drops of rain or moisture which befog and obscure the vision of the vehicle operator. Various types of preventives have been arranged to over-come the fogging of wind shields by moisture, but at best these remedies are very short lived.

My invention consists of a composition or solution formed from lanolin and cresol which is adapted to be applied to the wind shield and prevent fogging thereof. Lanolin is a wool fat or grease, of a purified nature, which is well known for its moisture-proof and water resisting properties. Cresol is a derivative from coal tar or wood tar and is a clear oily anticeptic liquid. Cresol is chemically related to creosote, which is well known as a deodorizer and a preservative of wood, flesh and the like, and a preventive of decay. In the forming of my composition I have found it well to mix approximately two-thirds parts by volume of lanolin and one-third part by volume of cresol, which forms a thick and heavy fluid. By rubbing, or applying, this composition to a wind shield that has been wet or rained upon, the water immediately runs off and the composition adheres to the wind shield in such a manner as to not obstruct the vision and provides a coating on which rain, or moisture, will not collect. The lanolin, by reason of its fatty nature, when cut to a workable viscosity by the cresol, acts as a base, or binder, whereby it may be conveniently handled and applied to any surface which it is desired to clarify for vision purposes.

A composition or solution formed of two-thirds lanolin and one-third cresol would be heated until such time as it was miscible and the ingredients thoroughly intermixed. A porous pad formed of any absorbing material such as felt, leather, skin or the like, would be dipped into the heated solution or have the solution sprayed thereon so as to be thoroughly impregnated. In order to thoroughly impregnate the pad throughout, the pad might be heated for a pre-determined period of time, the heat causing the composition in the pad to melt and by capillary attraction to uniformly saturate the pad throughout with the moisture proof composition. A pad will retain the solution for a period upward of one year's time, in such a condition that the said solution may be applied or rubbed on a wind shield that has been wet, or rained upon and will thoroughly cleanse the moisture therefrom, and will apply a coating thereon preventing the collection of additional water thereon. After the composition has been applied, as in the manner described, and it is allowed to become dried, its period of usefulness is ended requiring an additional application of the composition to the wind shield during the next wet period. The pad impregnated with the composition is preferably made of a small size so that the operator of an automobile could have it conveniently at hand at all times in readiness for instant use.

Having thus described this invention, what I claim and desire to secure by Letters Patent is:

1. A moisture proof composition for clarifying transparent surfaces consisting of lanolin and cresol.

2. A moisture proof composition for clarifying transparent surfaces consisting of approximately two-thirds part by volume of lanolin and approximately one-third part by volume of cresol.

3. A moisture proof composition for clarifying transparent surfaces consisting of approximately two-thirds part by volume of lanolin and approximately one-third part by volume of cresol mixed in a heated condition.

4. A moisture proof composition for clarifying transparent surfaces consisting of a mixture of lanolin and a thinning fluid.

5. A moisture proof composition for clarifying transparent surfaces consisting of a miscible solution of lanolin.

In testimony whereof, I have hereunto set my hand at San Francisco, California, this 4th day of August, 1923.

ALBERT M. BOWMAN.